United States Patent [19]

Kawakami

[11] Patent Number: 4,476,455
[45] Date of Patent: Oct. 9, 1984

[54] TIRE DEFLATION WARNING DEVICE

[75] Inventor: Masafumi Kawakami, Kobe, Japan

[73] Assignee: Sumitomo Rubber Industries, Ltd., Hyogo, Japan

[21] Appl. No.: 332,758

[22] Filed: Dec. 21, 1981

[30] Foreign Application Priority Data

Dec. 26, 1980 [JP] Japan .............................. 55-186031

[51] Int. Cl.³ .......................................... B60C 23/00
[52] U.S. Cl. .................................. 340/58; 116/34 R; 200/61.23
[58] Field of Search ...................... 340/58, 52; 116/34; 200/61.22, 61.23, 61.24

[56] References Cited

U.S. PATENT DOCUMENTS

| 1,772,949 | 8/1930 | Jacoby | 340/58 |
| 2,640,119 | 5/1953 | Bradford, Jr. | 340/58 |
| 2,917,020 | 12/1959 | Rivers | 116/34 |
| 3,593,269 | 7/1971 | Richardson | 340/58 |
| 4,353,322 | 10/1982 | Weglin | 116/34 |

FOREIGN PATENT DOCUMENTS 448013 9/1912 France .............................. 116/34

Primary Examiner—Glen R. Swann, III
Attorney, Agent, or Firm—Birch, Stewart, Kolasch & Birch

[57] ABSTRACT

A shielding case is tightly mounted on a rim of a wheel having a tubeless tire thereon. A rocking rod extending from the case into the interior of the tire is supported at its substantially intermediate portion for pivotal movement from a neutral position, and a warning element for attracting the attention of a driver responds to the movements of the rod, when the tire is deflated due, for instance, to puncture. The warning element may either be one end of the rocking rod which strikes the case to give a series of sounds or an electromagnetic switch arrangement which energizes a buzzer.

3 Claims, 5 Drawing Figures

TIRE DEFLATION WARNING DEVICE

BACKGROUND OF THE INVENTION

The present invention relates to a tire deflation warning device for use particularly with a tubeless tire for indicating and warning of a reduction of the internal pressure in the tubeless tire of a motor vehicle.

It has generally been recognized that it is highly important in terms of the traffic safety to detect an abnormal reduction of tire pressure and to warn an automobile driver of that effect. In view of this, various detecting and/or warning devices have heretofore been proposed. For example, one prior art detecting device utilizes a leaf spring deformable in proportion to the reduction of the tire pressure. However, this prior art device, although effective to provide an indication of the volume of the tire pressure reduced or remaining in terms of the magnitude of deformation of the leaf spring, has been found often to operate erroneously because physical properties of the leaf spring tend to be adversely affected by aging, the change in temperature and/or shocks and vibrations transmitted thereto from the wheels.

Of the prior art warning devices so designed as to have a capability of providing an indication of the tire pressure reduction to an automobile driver occupying a driver's seat inside the vehicle, mechanical, electromagnetic and radio warning devices are now well known. An example of the mechanical warning devices is disclosed in any one of the U.S. Pat. No. 3,265,822, patented Aug. 9, 1966, and the Japanese Patent Publication No. 55-127213 published Oct. 1, 1980.

The warning device disclosed in the U.S. patent comprises an actuating rod connected by a universally deflectable coil spring to a mechanical switch assembly which is demountably clamped to a wheel axle in a manner with the actuating rod extending downwards from the wheel axel towards the road surface. This device is so designed that, when the tire becomes deflated or overloaded, the free end of the actuating rod is upwardly deflected in contact with the road surface to switch on the switch assembly. This switch assembly is described as electrically connected to a warning light located for the attention of the driver.

The device of the U.S. patent referred to above has a disadvantage in that the driver will often be misled to the occurrence of the tire deflation when the free end of the actuating rod, positioned laterally spaced from the tire, contacts a discrete or continuous projection protruding upwardly from the road surface while the tire runs on a plain area of the road surface.

The warning device disclosed in the Japanese patent publication is complicated and delicate in design and operation and requires an air gauge or diaphragm valve to be fluid-connected to an air supply and removal valve, which air gauge is operatively coupled through an actuating wire to a switch assembly rigidly secured to a rim flange of a wheel on one side opposite to a corresponding bead portion of the tire. The switch assembly is described as electrically connected to a combination of a warning lamp and a buzzer.

Both of these prior art mechanical warning devices have a common disadvantage in that the reliability and the durability tend to be adversely affected by the accumulation of foreign matter such as dust and mud.

On the other hand, the prior art electromagnetic and radio warning devices have a disadvantage in that they tend not only to be adversely affected by an external magnetic field, but also to pose some problem associated with wave interference.

SUMMARY OF THE INVENTION

Accordingly, the present invention has been developed with a view to substantially eliminating the disadvantages and inconveniences inherent in the prior art tire deflation warning devices hereinabove discussed and has for its essential object to provide an improved tire deflation warning device particularly for use with a tubeless tire, which is reliable in operation without misleading the driver and without being substantially interfered with by an external disturbance.

To this end, the present invention provides an improved tire deflation warning device which comprises a shielding case mounted on a rim of a wheel having a tubeless tire thereon in fluid communication with the interior of the tire and a rocking rod having one end situated inside the shielding case and the other end protruding into the tire and terminating in spaced relation to the back of a tread area of the tire. According to a preferred embodiment of the present invention, when the tubeless tire is deflated, the other end of the rocking rod contacts the inner surface of the tread area of the tire, each time the rocking rod, then circulating together with the rotating wheel, is brought immediately above the road surface. The one end of the rocking rod repeatedly strikes the shielding case to give a series of rattling, clinking or clanging sounds as an indication of the tire deflated condition, the frequency of the striking repetition corresponding to the number of rotations of the wheel.

According to another preferred embodiment of the present invention, the one end of the rocking rod is operatively associated with at least one contactless switch adapted to be activated each time the one end of the rocking rod is aligned therewith. The contactless switch may be wired to any suitable indicator, for example, one or a combination of a warning lamp and a buzzer, located for the attention of the driver.

BRIEF DESCRIPTION OF DRAWINGS

These and other objects and features of the present invention will become readily understood from the following description of the present invention taken in conjunction with the preferred embodiments thereof with reference to the accompanying drawings, in which.

Before the description of the present invention proceeds, it should be noted that, throughout the accompanying drawings, like parts are designated by like reference numerals.

DETAILED DESCRIPTION

Figure 4:
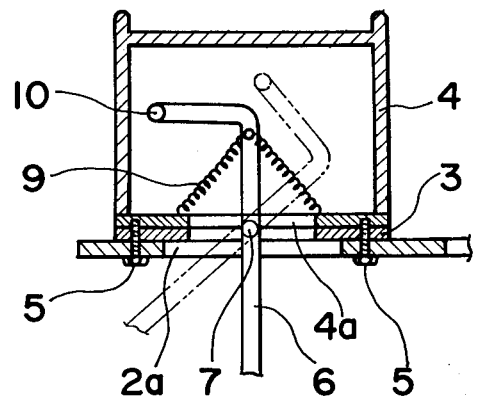
FIG. 4 is a schematic sectional view, on an enlarged scale, showing the details of a tire deflation warning device according to a preferred embodiment of the present invention.

Referring now to FIGS. 1 to 4, an automobile wheel is shown as having a peripheral rim 2 on which a tubeless tire 1 is mounted in a manner well known to those skilled in the art. As is well known, the tubeless tire 1 so mounted on the wheel rim is inflated by supplying air through an air supply and removal valve (not shown) carried by the wheel rim 2. As best shown in FIG. 4, for the purpose of the present invention, a portion of the wheel rim 2 preferably adjacent one of the opposite rim flanges against which respective bead portions of the tire 1 are tightly seated is perforated or drilled to provide an aperture 2a. A shielding case 4 having an aperture defined at 4a is mounted on the wheel rim 2, with the apertures 2a and 4a aligned with each other, at a position on one side of the wheel rim 2 opposite to the tire 1 and fixed tightly thereto by means of a plurality of fitting bolts 5 with a gasket 3 preferably interposed between the case 4 and the wheel rim 2.

Extending through the aligned apertures 2a and 4a is a rocking rod 6 having its opposite ends situated within the tire 1 and the case 4, respectively. While the opposite ends of the rocking rod 6 within the tire 1 and the case 4, respectively, are rounded, or otherwise rigidly connected with rigid balls 8 and 10, a substantially intermediate portion of the rocking rod 6 which passes through the aperture 4a is pivotally coupled to the case 4 by means of a support axle 7 so that the rocking rod 6 can pivot a certain angle $\theta$ from a neutral position, as defined later, about the support axle 7 in a plane parallel to the mid-circumferential plane of the tire 1. A portion of the rocking rod 6 between the support axle 7 and the ball 10 is so bent as to protrude towards a side wall of the case 4 such that the ball 10 can strike the case 4 as the rocking rod 4 is pivoted in one direction as will be described in detail leter.

The rocking rod 6 is normally held in the neutral position by the action of a pair of counterbalanced coil springs 9 extending within the case 4 between the rod 6 and the case 4 in the opposite directions. So long as the rocking rod 6 is in the neutral position as shown in FIG. 2, the ball 10 is held clear from the side wall of the case 4 as shown in FIG. 4.

So far as the embodiment shown in FIGS. 1 to 4 is involved, the case 4 is preferably of a cylindrical cross-section and is preferably made of such a durable metal as giving a discernible sound, such as a clanging, clinking or rattling sound, when striken by the ball 10.

Figure 2:
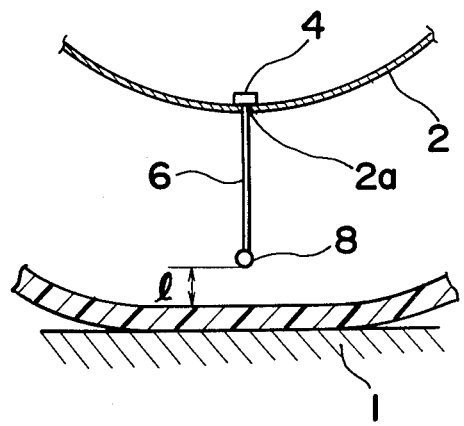
FIG. 2 is a schematic side sectional view of the portion of the wheel assembly showing the tubeless tire sufficiently inflated.
Figure 3:
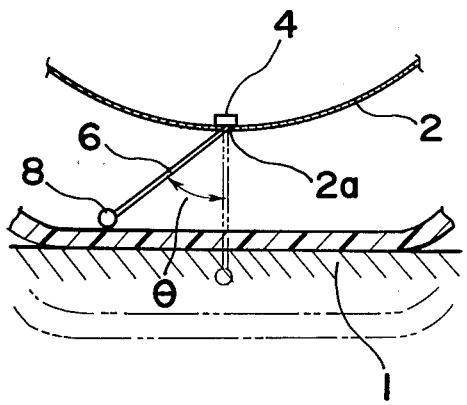
FIG. 3 is a view similar to FIG. 2, showing the tubeless tire deflated.

The length of a portion of the rocking rod 6 between the support axle 7 and the ball 8, or the position of the ball 8 inside the tire 1, is so selected that, when and so long as the rocking rod 6 is in the neutral position and so long as the tire 1 has been sufficiently inflated, the ball 8 is spaced a predetermined distance l from a portion of the inner surface of the tire 1 opposite to a tread area thereof as shown in FIG. 2. The distance l may be within the range of 40 to 45 mm in the case of the tire of a size identified by 165 SR 13.

Figure 1:
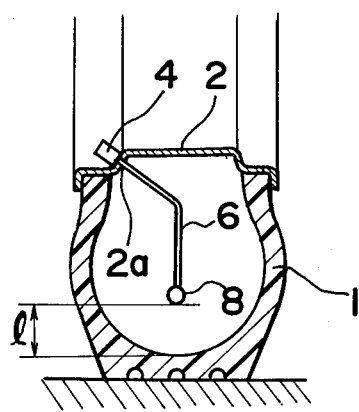
FIG. 1 is a schematic cross-sectional view of a portion of a wheel assembly constituted by a wheel and a tubeless tire, embodying the present invention.

The warning device of the construction shown in FIGS. 1 to 4 operates in the following manner. Assuming that the tubeless tire 1 is sufficiently inflated as shown in FIGS. 1 and 2, the warning device rotates together with the wheel because it is mounted on the wheel rim 2, and during this rotation, the rocking rod 6 is kept in the neutral position by the counterbalanced springs 9 with no possibility of the ball 8 contacting the inner surface of the tubeless tire 1.

However, when the tubeless tire 1 is insufficiently inflated or becomes deflated, each time the wheel assembly, i.e., the wheel with the tubeless tire 1 thereon, completes one rotation, the rocking rod 6 is pivoted against one of the counterbalanced springs 9 with the ball 8 in contact with the inner surface of the tubeless tire 1. Accordingly, the continued run of the motor vehicle with at least one tubeless tire insufficiently inflated or deflated results in the striking of the ball 10 against the side wall of the case 4 in a frequency corresponding to the number of rotations of the wheel, thereby giving a series of discernible sounds which are an indication of the insufficiently inflated or deflated condition of the tubeless tire 1. This is possible because the phenomenon is repeated during the rotation of the wheel wherein the ball 10 is brought into contact with and away from the side wall of the case 4 when the ball 8 contacts and is, by the actions of the springs 9, disengaged from that portion of the tubeless tire 1 held in contact with the road surface, respectively.

More specifically, in the case of the tubeless tire of the specific size referred to hereinbefore, i.e., that identified by 165 SR 13, the reduction of the tire pressure from a normal value of 1.8 kg/cm$^2$ to 0.8 kg/cm$^2$ would cause the distance l to become zero when the weight acts on the tubeless tire 1 through the wheel rim 2.

It is to be noted that the ball 10 may strike the side wall of the case 4 when the motor vehicle runs over a large obstacle, such as a large indent, a log or a large stone, lying on the road surface with at least one tubeless tire 1 collapsed radially inwardly so excessively as to cause the ball 8 to contact the inner surface of the tubeless tire 1. However, in such case, since the striking of the ball 8 against the side wall of the case 4 would not take place frequently nor at regular intervals, the driver can perceive that this is not the occurrence of an insufficiently inflated or deflated condition of the tubeless tire 1.

Although the warning device of the construction described hereinabove with reference to FIGS. 1 to 4 is a mechanical one, it may be constructed in the form of an electromagnetic one and this will be described with particular reference to FIG. 5.

Figure 5:
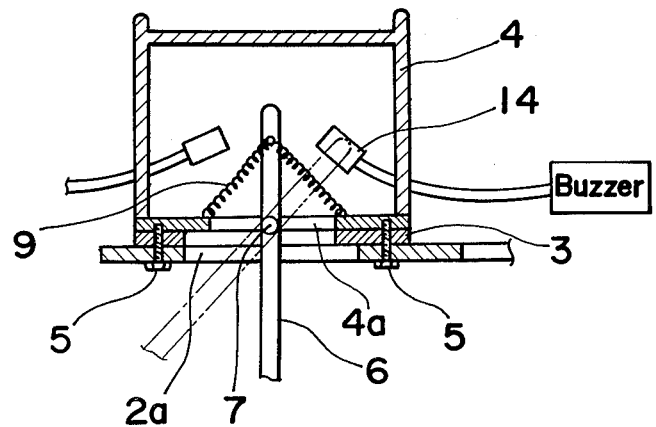
FIG. 5 is a view similar to FIG. 4, showing the details of the warning device according to another preferred embodiment of the present invention.

Referring to FIG. 5, the case 4 may be made of any suitable material and in any desired shape although the case 4 in the foregoing embodiment is preferred to be of cylindrical cross section and of a metal effective to give a discernible sound when struck. What is additionally required in this embodiment shown in FIG. 5 is at least one contactless switch 14 which is to be disposed within the case 4 at or adjacent one extremity of the path of movement of the end of the rocking rod 6 opposite to the ball 8 so that, as the end of the rocking rod 6 opposite to the ball 8 is aligned with the contactless switch 14, the switch 14 is activated to cause a buzzer to be energized. The buzzer should be located for the attention of the driver and electrically connected with the switch 14 through a suitable wiring system.

From the foregoing, it has now become clear that, since the case 4 is mounted on the wheel rim 2 in a water and gas tight manner with the major component parts of the warning device arranged and protected inside the case 4, there is no possibility of foreign matter intruding into the case 4. There is also no possibility of the internal air leaking from the tubeless tire 1. Therefore, the present invention is free from any problem associated with the adherence of foreign matter to the rocking rod, which would otherwise result in reduction in reliability of the warning device.

Although the present invention has been fully described in connection with the preferred embodiments thereof with reference to the accompanying drawings, it is to be noted that various changes and modifications will be apparent to those skilled in the art. By way of example, in order for the warning device of the present invention to be utilizeable with the tubeless tire of a different size, the rocking rod 6 may be made telescopically extensible or may be composed of two rod portions one adjustably connected or threadingly connected to the other.

Accordingly, such changes and modifications are to be understood as included within the true scope of the present invention unless they depart therefrom.

What is claimed is:

1. A tire deflation warning device which comprises in combination:
    a shielding case tightly mounted in a water and gas tight manner on a rim of a wheel having a tubeless tire thereon;
    a rocking rod having first and second ends opposite to each other with an intermediate portion therebetween, said first and second ends being respectively situated inside said shielding case and said tubeless tire, said rocking rod being pivotable about its intermediate portion in at least one direction from a neutral position;
    a biasing means for holding said rocking rod in said neutral position; and
    means for providing an indication of the loss of air from said tire each time said rocking rod is pivoted from and back to said neutral position.

2. A warning device as claimed in claim 1, wherein said indication providing means comprises at least one switch means adapted to be activated when said first end of said rocking rod pivots from said neutral position to align with and activate said switch means, so as to energize a sound generating means electrically connected with said switch means for generating a warning sound when said switch means is so activated.

3. A warning device as claimed in claim 1, wherein said indication providing means comprises a ball means on said first end of said rocking rod and said shielding case comprises a material capable of producing a discernible sound when said ball means strikes said shielding case when said loss of air from said tire is substantial enough to displace said rod from the neutral position.

* * * * *